United States Patent [19]

Makishita

[11] Patent Number: 5,280,604
[45] Date of Patent: Jan. 18, 1994

[54] MULTIPROCESSOR SYSTEM SHARING EXPANDABLE VIRTUAL MEMORY AND COMMON OPERATING SYSTEM

[75] Inventor: Masahito Makishita, Tokyo, Japan

[73] Assignee: NEC Corporation, Tokyo, Japan

[21] Appl. No.: 25,813

[22] Filed: Mar. 3, 1993

Related U.S. Application Data

[63] Continuation of Ser. No. 798,979, Nov. 29, 1991, abandoned, which is a continuation of Ser. No. 364,539, Jun. 12, 1989, abandoned, which is a continuation of Ser. No. 138,051, Dec. 28, 1987, abandoned.

[30] Foreign Application Priority Data

Dec. 29, 1986 [JP] Japan .................. 61-309479

[51] Int. Cl.$^5$ .................. G06F 12/02; G06F 13/00
[52] U.S. Cl. .................. 395/425; 395/400; 364/DIG. 1
[58] Field of Search .................. 364/200, 900; 395/425, 395/400

[56] References Cited

U.S. PATENT DOCUMENTS

| | | | |
|---|---|---|---|
| 3,812,468 | 5/1974 | Wollum et al. | 395/800 |
| 3,812,469 | 5/1974 | Hauck et al. | 395/325 |
| 3,950,729 | 4/1976 | Fletcher et al. | 395/575 |
| 4,073,005 | 2/1978 | Parkin | 395/650 |
| 4,209,839 | 6/1980 | Bederman | 395/425 |
| 4,318,174 | 3/1982 | Suzuki et al. | 395/275 |
| 4,354,225 | 10/1982 | Frieder et al. | 395/275 |
| 4,494,189 | 1/1985 | Bean et al. | 395/425 |
| 4,527,237 | 7/1985 | Frieder et al. | 395/200 |
| 4,564,903 | 1/1986 | Guyette et al. | 395/425 |
| 4,636,948 | 1/1987 | Gdaniec et al. | 395/650 |
| 5,109,522 | 4/1992 | Lent et al. | 395/800 |

FOREIGN PATENT DOCUMENTS 0194696 3/1986 European Pat. Off. .
1509393 4/1974 United Kingdom .

OTHER PUBLICATIONS

"OS/VS2 System Logic Library", vol. 2, IBM (Oct. 1979), pp. 2-255 to 2-280.
"OS/VS2 System Logic Library", vol. 4, IBM (Oct. 1979), pp. 4-115 to 4-117.6.

Primary Examiner—Joseph L. Dixon
Assistant Examiner—Matthew M. Kim
Attorney, Agent, or Firm—Foley & Lardner

[57] ABSTRACT

A multiprocessor system in which a single operating system is controlled by a number of central processing units. The system allows the expansion of its virtual memory without major modifications the operating system. The system utilizes two virtual memories, one with a larger memory capacity than the other. Each memory is controlled by a space control section, which, in turn, is connected to an associated central processing unit. A first program is executed by both space control sections, while a second program is operated by only one of the space control sections. The second program is stored in the second virtual memory, in an area of the second virtual memory not overlapping the area of the first virtual memory.

6 Claims, 6 Drawing Sheets

MULTIPROCESSOR SYSTEM SHARING EXPANDABLE VIRTUAL MEMORY AND COMMON OPERATING SYSTEM

This application is a continuation of U.S. application Ser. No. 07/798,979, filed Nov. 29, 1991, now abandoned, which is a continuation of Ser. No. 07/364,539 filed Jun. 12, 1989, now abandoned, which is a continuation of Ser. No. 07/138,051 filed Dec. 28, 1987, now abandoned.

BACKGROUND OF THE INVENTION

The present invention relates to a multiprocessor system controlled by a single operating system (OS) and having a plurality of central processor units (CPU's) and, more particularly, to a multiprocessor system permitting expansion of the virtual memory capacity of the system without significantly affecting the OS thereof.

Generally, irrespective of which one of plural CPU's executes the OS, it is necessary for the OS to be able to refer to every area in itself and in the user program.

Because of this need, in this kind of prior art multiprocessor system, every CPU has a virtual memory of the same capacity. Thus, every CPU has a common number of bits indicating an address, and the address section of a command and the area in which to store the address are as large as that number of bits.

Such a technique has been described in a manual entitled "OS/VS2 System Logic Library, Volumes 2 and 4" pp. 2-255 to 2-280 and 4-115 to 4-117.6, published in October 1979 by International Business Machines Corporation, and the gazette of the U.K. Patent No. 1509393.

Meanwhile, the size of an executable program is limited by that of the virtual memory. Therefore, to execute a larger program, the virtual memory capacity has to be expanded.

To expand the virtual memory capacity to satisfy this requirement, the number of bits for an address can be increased sufficiently for the OS to be able to refer to the whole expanded virtual memory. However, addresses in the address sections of commands and the address storage area would have to be revised to reflect the increased number of bits. Therefore, there is the disadvantage that, if this method is used, the hardware structure of each CPU will have to be altered so that the expanded virtual memory can be processed. Moreover, there is another disadvantage that the OS itself has to be modified to a major extent because the address section of the command and the address storing area are expanded to the same number of bits.

An object of the present invention is, therefore, to obviate the aforementioned disadvantages and provide a multiprocessor system whose virtual memory capacity can be expanded without entailing major modification of the OS.

SUMMARY OF THE INVENTION

According to one aspect of the invention, there is provided a multiprocessor system having first and second central processor units (CPU's).

Said multiprocessor system comprises: a first virtual memory having a smaller memory capacity and controlled by the first CPU;

an operating system (OS) operated by both the first and second CPU's and referring only to the area of the first virtual memory means;

first space control mechanism means for controlling the virtual space of the first virtual memory;

second virtual memory, including at least a part of the first virtual memory, having a greater memory capacity than that of the first virtual memory means, and controlled by the second CPU;

second space control mechanism for controlling the virtual space of this second virtual memory;

first program referred to by both the first and second space control; and second program, referred to only by the second space control mechanism and stored in an area of the second virtual memory not overlapping the area of the first virtual memory.

BRIEF DESCRIPTION OF THE DRAWINGS

Other features and advantages of the present invention will become apparent from the detailed description hereunder of a preferred embodiment thereof, when taken in conjunction with the accompanying drawings, wherein.

In the figures, the same reference numerals represent respectively the same constituent elements.

DETAILED DESCRIPTION OF THE PREFERRED EMBODIMENT

Next, a preferred embodiment of the invention will be described in detail with reference to the accompanying drawings.

Figure 1:
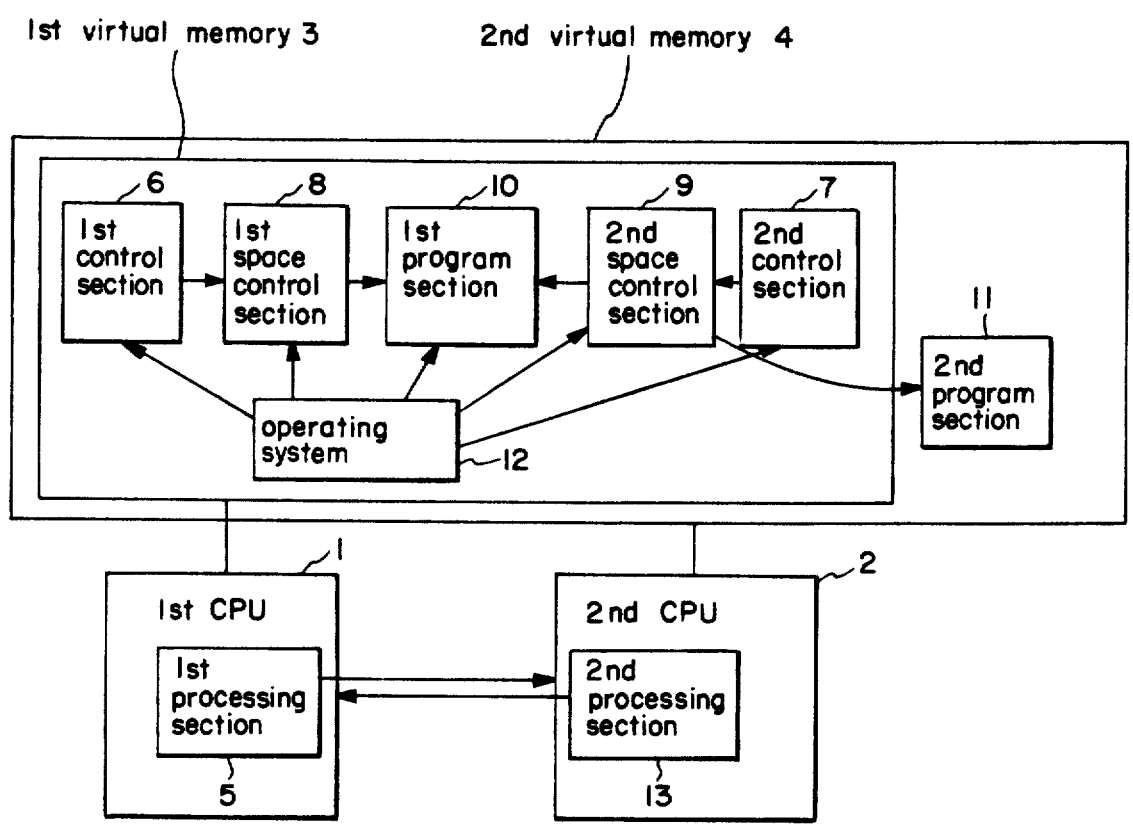
FIG. 1 is a diagram of the preferred embodiment of the invention.

Referring to FIG. 1, the embodiment of the invention includes a first virtual memory 3 having a smaller memory capacity, a first central processor unit (CPU) 1 having a hardware structure capable of handling the first virtual memory 3, a second virtual memory 4 having a greater memory capacity, and a second CPU 2 having a hardware structure capable of handling the second virtual memory 4.

The first virtual memory 3 further includes an operating system (OS) 12 which operates on the first CPU 1 and whose reference range is limited to the area of the first virtual memory 3, a first program section 10 executed by both first CPU 1 and second CPU 2, a first control section 6 executed by the first CPU 1 for executing the first program section 10, a first space control section 8, responsive to instruction information (an address space indicating word) from the first control section 6, for referring to the first virtual memory 3 including the first program section 10, a second control section 7 for executing the first program section 10 and a second program section 11 which is present only in the second virtual memory 4, and a second space control section 9, responsive to a space indicating word from said second control section 7, for referring to the second virtual memory 4 including the first and second program sections 10 and 11.

Figure 6:
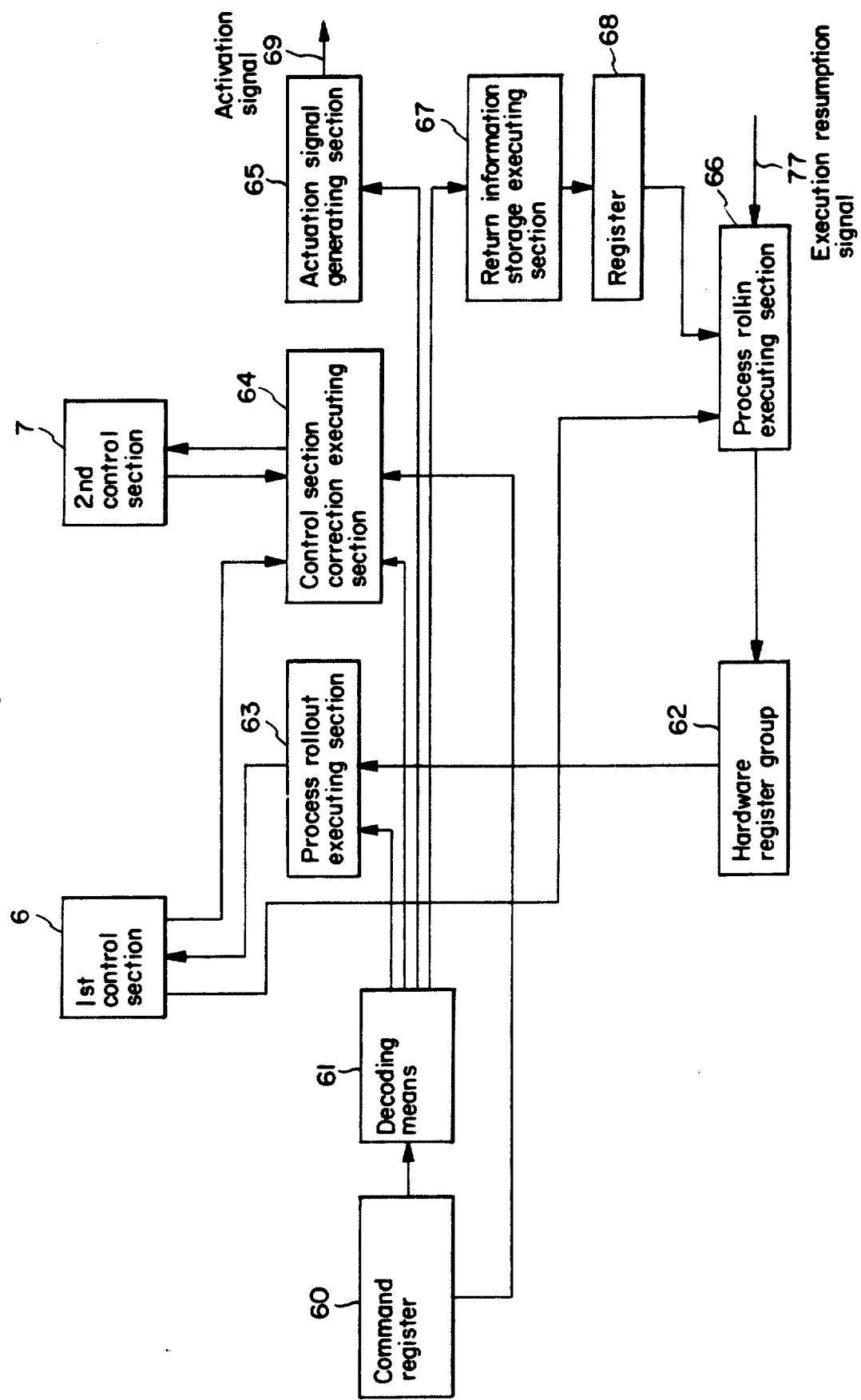
FIG. 6 is a diagram of an example of the structure of a processing section 5.
Figure 7:
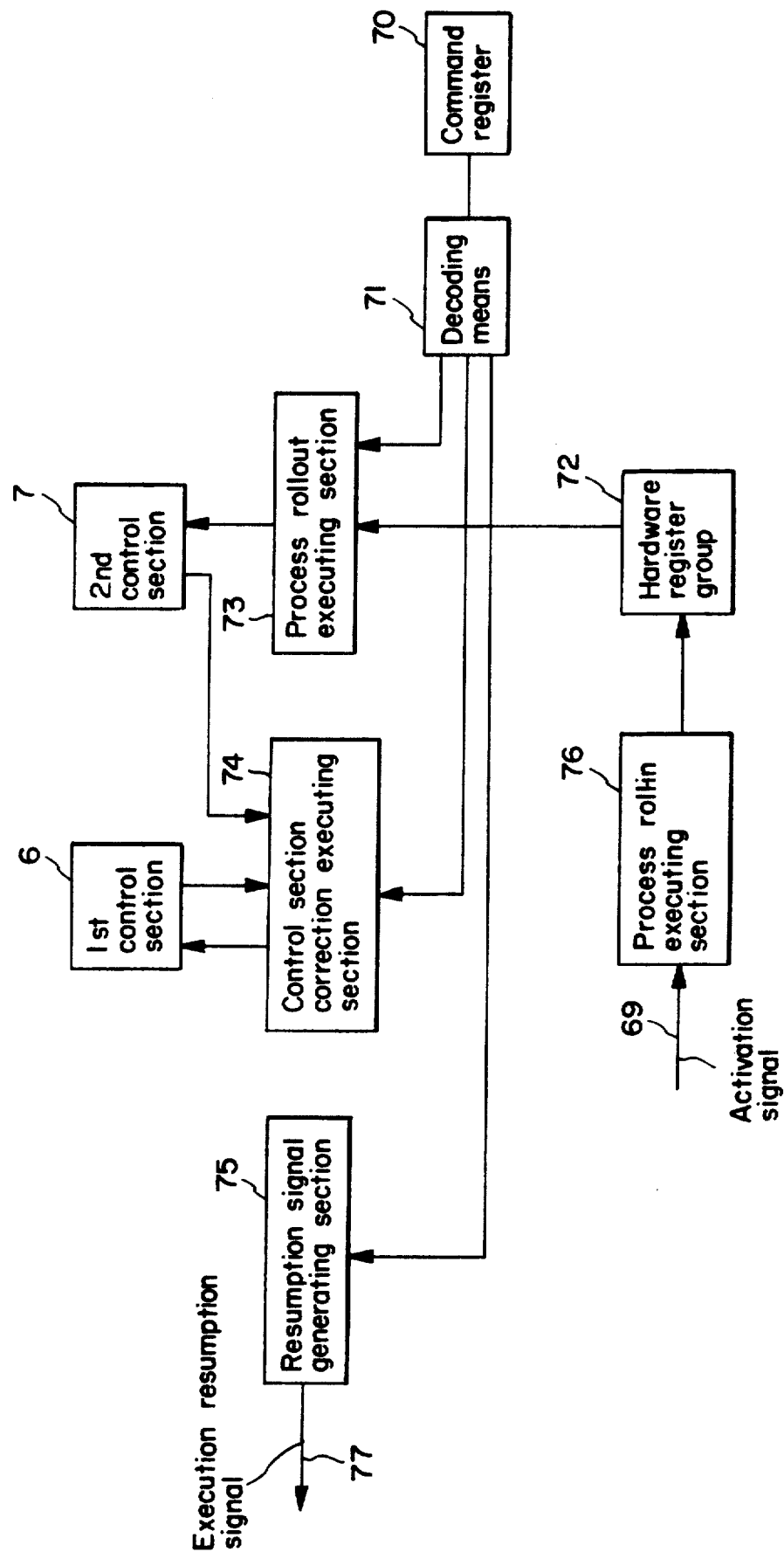
FIG. 7 is a diagram of an example of the structure of another processing section 13.

The first CPU 1 has a processing unit 5 having the structure shown in FIG. 6, and the second CPU 2 has a processing section 13 having the structure shown in FIG. 7.

Next will be described in detail the difference in size between the first and second space control sections 8 and 9 with reference to FIGS. 1 and 2.

Figure 2:
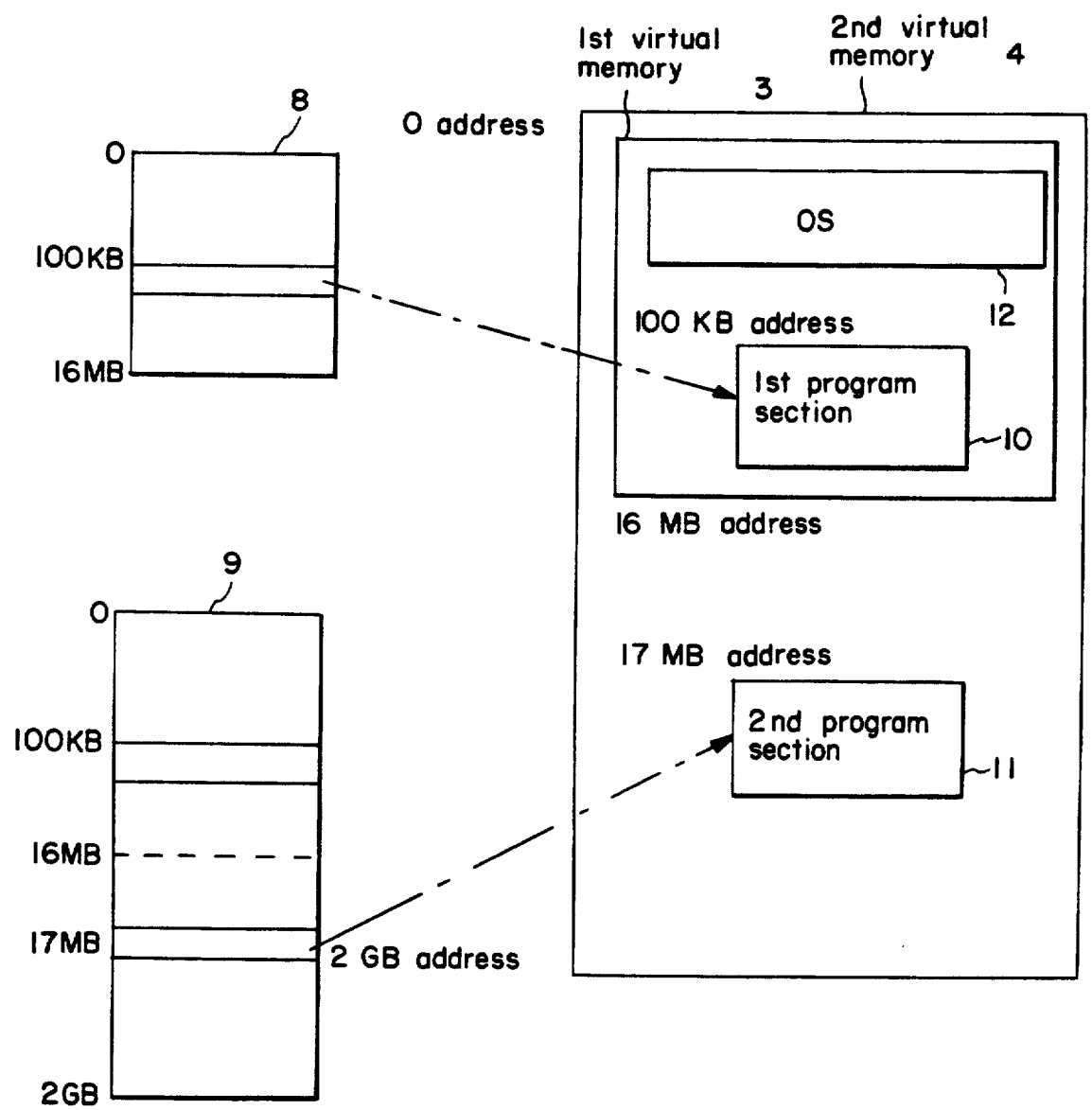
FIG. 2 is a diagram for describing the difference in size between space control units 8 and 9 of FIG. 1.

Referring to FIGS. 1 and 2, it is supposed that the same addresses in the first and second virtual memories 3 and 4 represent respectively the same data. It is further supposed that the first virtual memory 3 is 16 megabytes (MB) at the maximum, the second virtual memory 4 is 2 gigabytes (GB) at the maximum, the first program section 10 has a 100-kilobyte (KB) address or less, and that the second program section 11 has a 17-MB address or less. Therefore, the first space control section 8 can cover 16 MB maximum, while the second space control section 9 is great enough to cover 2 GB. Accordingly, the second program section 11 can be referred to by the corresponding entries in the second space control section 9.

In such a structure, if for instance one large program $\alpha$, which is too large for the memory capacity of the first virtual memory 3, is to be executed, the program $\alpha$ is divided into the first program section 10 and the second program 11. The first program section 10 is arranged in the first virtual memory 3, and the second program section 11 is arranged in an area outside the first virtual memory 3 in the second virtual memory 4. At the same time, the processing sections 5 and 13 execute processing to transfer the execution of the program $\alpha$ from the first CPU 1 to the second CPU 2 and execute processing necessary to return the execution of the program $\alpha$ from the second CPU 2 to the first CPU 1. As a result, the second virtual memory 4 whose memory capacity is too great to be used by the first CPU 1 can be used by the single program $\alpha$. In other words, even if the OS 12 can access only the first virtual memory 3, giving the second space control section 9 to the program $\alpha$ will enable the program $\alpha$ to add the second program section 11 to itself and will enable the program $\alpha$ to use the second virtual memory 4 whose memory capacity is even greater than that of the OS 12.

Although the following description of the preferred embodiment will suppose the use of the two control sections 6 and 7 to execute the single program $\alpha$, the present invention is not limited to that, but can be implemented with a single control section combining the two.

Next, the operation of the preferred embodiment of the present invention will be described in detail with reference to FIGS. 1 to 7 using the execution of the program $\alpha$ as an example.

First, the relationship between an example of the contents of the first program section 10 and the second program section 11 will be described below.

Figure 3:
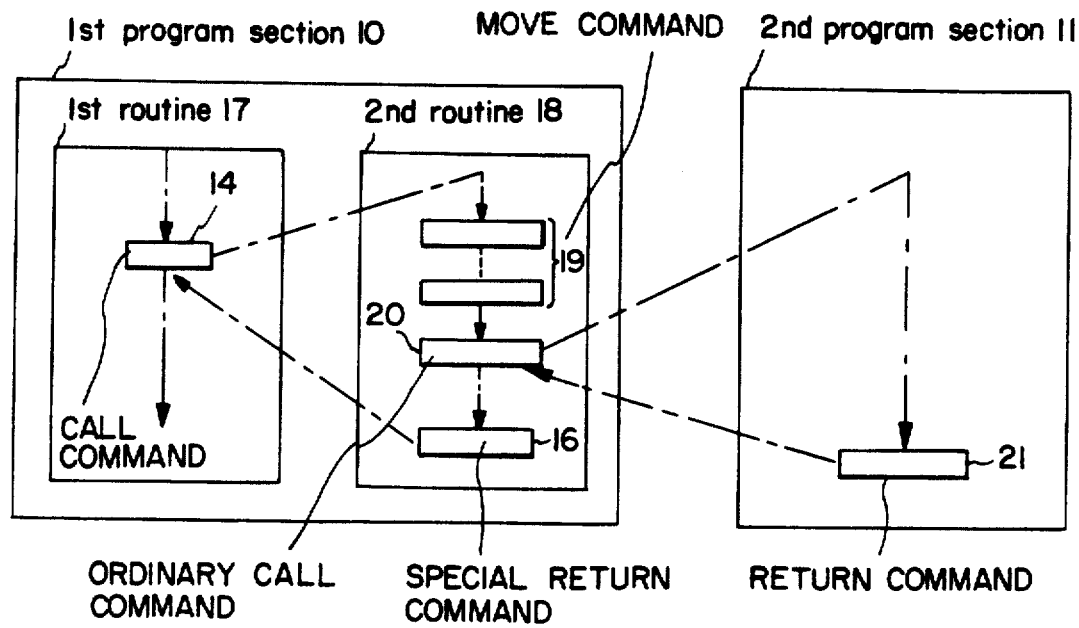
FIG. 3 is a diagram of the structure of a program.

Referring to FIGS. 1 and 3, the first program section 10 includes a first routine 17 described in a 24-bit address mode and executed by the first CPU 1, and a second routine 18 described in a 31-bit address mode and executed by the second CPU 2. The first routine 17 includes a special call (CALL) command 14, and the second routine 18 includes a move (MOVE) command group 19, an ordinary call command 20 and a special return command 16.

Figure 4A:
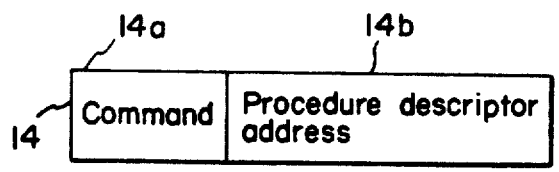
FIGS. 4A to 4C are diagrams of the formats of a special call command and a special return command.
Figure 4B:
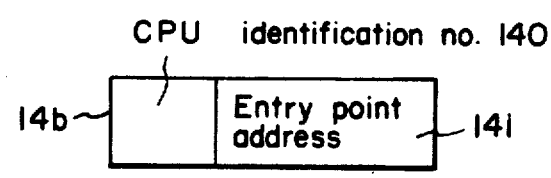

Referring now to FIG. 4A, the special call command 14 consists of a command code 14a and a procedure descriptor address 14b. Referring to FIG. 4B, the procedure descriptor address 14b further consists of a CPU identification number 140 indicating whether the second routine 18, to be called by a call command, is to be executed by the first CPU 1 or by the second CPU 2, and an entry point address 141. The CPU identification number 140 is "0" when the second routine 18 is to be executed by the first CPU 1, or "1" when it is to be executed by the second CPU 2. Since this embodiment of the invention has two CPU's, a one-bit flag suffices for the CPU identification number 140. However, a system having more CPU's would need more than one bit.

Figure 4C:
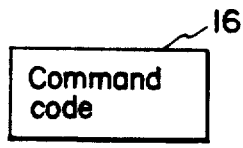

Referring to FIG. 4C, the special return command 16 consists of a command code.

Based on the foregoing premises, the operation of the embodiment of the present invention will be described below.

Figure 5:
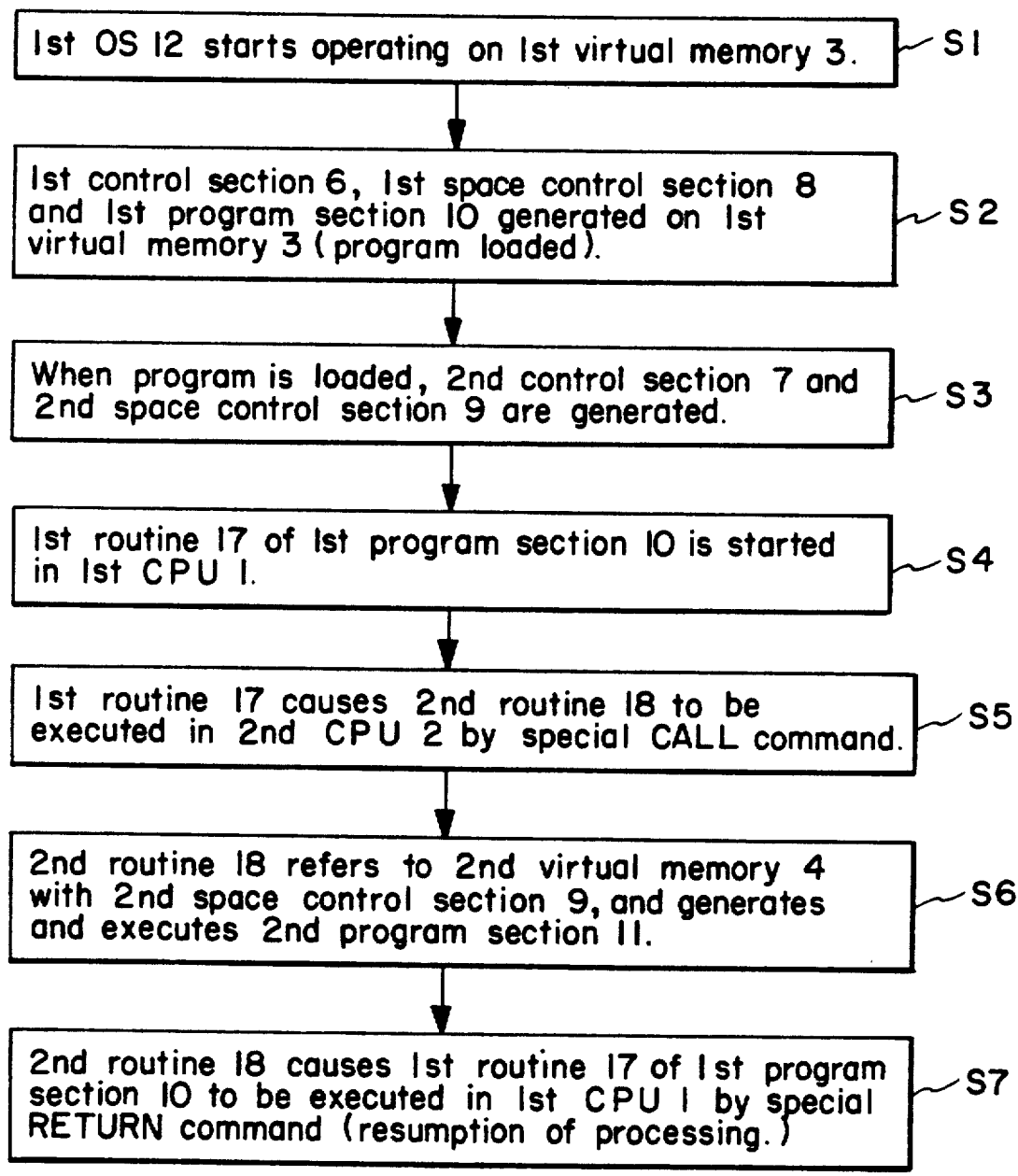
FIG. 5 is a diagram for describing the operation of the preferred embodiment of the invention.

Referring to FIGS. 1 and 5, the OS 12 starts operation on the first virtual memory 3 in the first CPU 1 (S1). In starting the execution of the program $\alpha$, the first CPU 1 generates the first control section 6 and the first space control section 8 under the control of the OS 12. Then, the first CPU 1 loads a main memory unit (not shown) with the first program section 10 (S2). Further, the first CPU 1 generates the second control section 7 and the second space control section 9 for the second virtual memory 4 under the control of the OS 12 (S3). Here, the OS 12 only controls the capacity of, but does not refer to, the second virtual memory 4.

Next, the contents of the first control section 6 are moved to a hardware register group 62 of the first processing section 5 of the first CPU 1, and the execution of the first routine 17 in the first program section 10 is started by the first CPU 1 (S4).

Referring to FIG. 3, the first routine 17 is one of the routines constituting the first program section 10, and the special call command 14, described with reference to FIGS. 4A and 4B, is buried therein.

Referring again to FIGS. 1 and 4B, in the CPU identification number 140 is set the logical "1" indicating switchover from the first CPU 1 to the second CPU 2, and in the entry point address 141 is set the address of the lead command of the second routine 18 which is part of the first program section 10.

As the program is successively executed by the first CPU 1, the special call command 14 of the first routine 17 is executed (see S5 in FIG. 5). In executing it, the first processing section 5 in the first CPU 1 achieves the following sequence of processing.

Referring to FIGS. 1 and 6, in response to the issue of the special call command 14 in the first CPU 1, a command register 60 stores the special call command 14. Then in response to the special call command 14 from this command register 60, decoding means 61 successively actuates a process roll-out executing section 63, a control section correction executing section 64, a return information storage executing section 67, and an actuation signal generating section 65. In response to the actuation of the process roll-out executing section 63, the contents of the hardware register group 62, used in the execution of the first program section 10, are returned to the first control section 6 in the first virtual memory 3.

Next, the contents of the second control section 7, paired in advance with the first control section 6, are corrected to become identical with those of the first control section 6. The pairing information for the first and second control sections 6 and 7 is present in the first control section 6. In the correcting process, the address space indicating word is not changed. Thus the control section correction executing section 64 moves the contents from the hardware register group 62 to the first control section 6, from the first control section 6 to the second control section 7 to correct the contents of the latter. Throughout this period, the address space indicating word in the second control section 7 is not changed. Along with this, the address to be executed next in the second control section 7 is altered according to the entry point address taken out of the command register 60. The return information storage executing section 67 stores the address of the command next to the special call command 14 in register 68. After this action, the actuation signal generating section 65 sends out an actuation signal, for execution of the second control section 7, to the second CPU 2.

Referring now to FIGS. 1 and 7, in response to the actuation signal from the actuation signal generating section 65 of the first CPU 1, a process roll-in executing section 76 is actuated. In response to this actuation, the contents of the second control section 7 are moved to hardware register group 72 to start execution by the second control section 7.

Therefore, the second CPU 2 starts execution from the entry point address representing the second routine 18. As a result of this step, the processing by the first program section 10 that has been executed in the first CPU 1 is taken over by the second CPU 2.

In the foregoing embodiment, the first program section 10 actuated in the CPU 1 by the OS 12, issues the special call command 14 to operate the first and second processing sections 5 and 13 in order to shift the control to the second CPU 2. However, the present invention is not limited to this arrangement. For instance, it is also possible to actuate the second routine 18 of the first program section 10, after the OS 12 has generated the second space control section 9, by an instruction from the first CPU 1 to the second CPU 2 to let the first program section 10, operated by the second CPU 2, generate the contents of the second program section 11 in a portion of memory that can be referred to by the second space control section 9 so that the second program section 11 can be executed by program calling.

Referring to FIG. 5, the second routine 18 refers to the second virtual memory 4 by means of the second space control section 9, and generates and executes the second program section 11 (S6).

This step will be described in detail below.

Referring to FIGS. 1 and 3, the second CPU 2, during the execution of the second routine 18 by the first program 10, moves the second program section 11 to a portion of memory outside the first virtual memory 3, in the second virtual memory 4, by executing the move command group 19. When it is necessary to call out of the second routine 18, the call command 20, buried in the second routine 18, is executed. This processing by the call command 20, which is a call from the second routine 18 to the second program section 11, takes place in the second virtual memory 4. Therefore, no special call command shown in FIG. 4A is required, but an ordinary CALL command, prepared for a sophisticated language, such as COBOL, for processing by general processors, is sufficient.

In the second program section 11, whose execution is started by the aforementioned call command 20, either data are set or a command is set.

In the second CPU 2, the second program section 11 is executed in response to the foregoing call command 20. When it is necessary to return from the second program section 11 to the second routine 18, an ordinary return command 21 is executed because the processing of the return takes place in the second virtual memory 4. In response to the execution of this return command 21, the command after the call command 20 of the second routine 18 is executed. In the CPU 2, the execution of the second routine 18 proceeds. The execution of the special return command 16 in the second CPU 2 takes place as described below (see S7 in FIG. 5).

Referring to FIGS. 1 and 7, in response to the issue of the special return command 16 in the second CPU 2, a command register 70 stores the special return command 16. Then in response to the issue of the special return command 16 from this command register 70, decoding means 71 successively actuates a process roll-out executing section 73, a control section correction executing section 74, and a resumption signal generating section 75. In response to this actuation, the process roll-out executing section 73 returns the contents of the hardware register group 72, used in the execution of the first and second program sections 10 and 11, to the second control section 7 in the second virtual memory 4.

The control section correction executing section 74 corrects the first control section 6 with the contents of the second control section 7 such that the former, paired in advance with the latter, have the same contents as the second control section 7 on standby. The pairing information for the second and first control sections 7 and 6 is present in the second control section 7. The resumption signal generating section 75 sends out an execution resumption signal for the first control section 6 to the first CPU 1.

Referring now to FIGS. 1 and 6, in response to the resumption signal (77) from the resumption signal generating section 75, a process roll-in executing section 66 moves the contents of the first control section 6, indicated by the resumption signal, to the hardware register group 62 in the first CPU 1. This moving action, however, takes place after the entry point address, placed on standby when the special call command 14 was executed, is stored for the next execution in the first control section 6.

This lets the first CPU 1 resume the execution from a command after special call command 14.

The foregoing processing switches the control from the second CPU 2 to the first CPU 1.

In this embodiment, a special return command is used for switching from the second CPU 2 to the first CPU 1. The present invention, however, is not limited to this arrangement. A return address and, if necessary, a special command having an identification number of the first CPU 1, may be used similarly to the switching from the first CPU 1 to the second CPU 2.

The reason for using a special return command in this embodiment is the advantage explained below. If an arrangement is made with the special call command regarding the return address and, if necessary, the standby of the identification number of the pertinent CPU to use, for instance, a register having a predetermined number, a special return command having only the command code shown in FIG. 4C can be used.

In the above described operation, the second program section 11 cannot directly use the functions of the OS 12. Therefore the second program section 11 should be composed either to have contents not requiring the use of the functions of the OS 12 or, if OS 12 functions have to be used, to use the first routine 17 of the first program section 10.

The present invention uses a formula in which the second space control section 9, to cover the second virtual memory 4 which has a greater memory capacity, is provided separately from the first space control section 8, having the first virtual memory 3 which has a smaller storage capacity, in order to give instructions from the control sections 6 and 7 to the first and second space control sections 8 and 9 for program execution.

According to the invention, when the program is executed on the first CPU 1 under the control of the control section 6, in response to an instruction, the first virtual memory 3 can be referred to by using the first space control section 8, and the functions of the OS can also be used. When the program is executed on the second CPU 2 under the control of the second control section 7, the second virtual memory 4 can be referred to by using the second space control section 9. Therefore, according to the invention, the program to be executed is divided into the first and second program sections 10 and 11, of which the first program section 10 is arranged in the first virtual memory 3 and the second program section 11 is arranged in the second virtual memory 4. According to the invention, program execution is switched from the first CPU 1 to the second CPU 2 at an instruction from the first processing section 5, and is returned from the second CPU 2 to the first CPU 1 at an instruction from the second processing section 13. The invention, by using this formula, enables the program to use the second virtual memory 4 with its greater memory capacity. In this case, since the range of reference of the OS is limited to the common part of the virtual memory, i.e., within the first virtual memory 3, the OS has to be modified only slightly, involving little more than the control of the second space control section 9. As a result, the virtual memory capacity can be expanded without entailing substantial modification of the OS.

What is claimed is:

1. A multiprocessor system comprising:
   first and second central processor units (CPU's) executing a related first and second program;
   a first virtual memory, said first CPU having a hardware structure to access said first virtual memory;
   a second virtual memory which includes all of said first virtual memory, said second virtual memory having a greater memory capacity than a memory capacity of said first virtual memory, said second CPU having a hardware structure to access said second virtual memory;
   an operating system (OS) residing in said first virtual memory, operated by both said first and second CPU's said operating system having access to said first virtual memory and not having access to a part of said second virtual memory which is not part of said first virtual memory;
   a first control section executed by said first CPU, said first control section executing said first program, said first control section containing a first address space indicating word;
   a second control section executed by said second CPU, said second control section executing said first program and said second program, said second control section containing a second address space indicating word;
   first space control means, responsive to said first address space indicating word from said first control section, coupled to said first virtual memory, for controlling access to virtual memory space of said first virtual memory;
   second space control means, responsive to said second address space indicating word from said second control section, coupled to said second virtual memory, for controlling access to virtual memory space of said second virtual memory;
   said first program being stored in said first virtual memory, said first program being accessed by both of said first and second space control means; and
   said second program being accessed only by said second space control means said second program being stored in said part of said second virtual memory which is not part of said first virtual memory.

2. An information processing system as in claim 1, in which said first CPU generates first and second control sections and generates said first and second space control means, under control of said operating system.

3. An information processing system comprising:
   first and second central processor units (CPU's) executing a related first and second program section;
   first and second virtual memories, said first virtual memory having a smaller memory capacity than said second virtual memory, said second virtual memory including all of said first virtual memory, said second virtual memory also having memory space which is not in common with said first virtual memory;
   an operating system (OS) residing in said first virtual memory operated by both said first and second CPU's, said operating system having access to said first virtual memory and not having access to a part of said second virtual memory which is not part of said first virtual memory;
   a control section executed by said first and second CPU's for executing said first program section and said second program section, said control section containing a first and second space indicating word;
   first space control means, responsive to said first space indicating word from said control section, for controlling access to said first virtual memory; and
   second space control means, responsive to said second space indicating word from said control section, for controlling access to said second virtual memory;
   said first program section being stored in said first virtual memory, said first program being accessible by both of said first and second space control means; and
   said second program section being accessible only by said second space control means, said second program being stored in an area of said second virtual memory which is not in common with said first virtual memory.

4. An information processing system of claim 3, wherein same addresses in said first and second virtual memories access a same memory location.

5. An information processing system of claim 3, wherein said control section includes a first control section, coupled to said first space control means, for executing said first program section by said first CPU, and a second control section, coupled to said second space control means, for executing both said first program section and said second program section by said second CPU.

6. An information processing system of claim 3, in which said first and second central processing units include, respectively, a first and second processing section, and wherein a main program is comprised of said first and second program sections, said main program requiring execution of said first program section and said second program section, program execution being switched from said first to said second central processing unit by a call instruction from said first processing section and returned to said first central processing unit by a return instruction from said second processing section.

* * * * *